United States Patent Office 3,843,330
Patented Oct. 22, 1974

3,843,330
REGENERATION APPARATUS
Algie J. Conner, Downers Grove, Daniel Dudych, Des Plaines, and Willas L. Vermilion, Arlington Heights, Ill., assignors to Universal Oil Products Company, Des Plaines, Ill.
Filed May 30, 1972, Ser. No. 258,135
Int. Cl. B01j 9/20
U.S. Cl. 23—288 B                 2 Claims

ABSTRACT OF THE DISCLOSURE

An apparatus for regenerating catalyst which contains coke deposited thereon. The apparatus incorporates features which allow afterburning of carbon monoxide within the apparatus vessel in a safe and efficient manner. The apparatus incorporates a spent catalyst receiving chamber, a transfer conduit and a regenerated catalyst receiving chamber in series. The afterburning of carbon monoxide within the apparatus can take place in the first mentioned chamber, the transfer conduit or in the second mentioned chamber or in combinations of each. A new feature of the apparatus is the ability to contain safely and efficiently the burning of carbon monoxide to carbon dioxide within a regeneration apparatus.

BACKGROUND OF THE INVENTION

Field of the Invention

The field of art to which this invention pertains is catalyst regeneration apparatus. More specifically, the present invention relates to a regeneration apparatus which is applicable for use in regenerating fluidized catalytic cracking catalyst which have become spent by deposition of coke thereon.

Description of the Prior Art

Regeneration apparatus and processes utilizing such apparatus are known in the art especially in the fluidized catalytic cracking areas. In particular, the processes for the most part are centered around maximizing the removal of coke on catalyst by controlling oxygen rates passing into the regeneration zone to both reduce the content of coke on regenerated catalyst leaving the regeneration zone while attempting to minimize, if not totally eliminate, any possibility of afterburning taking place within the regeneration zone. Afterburning is referred to in the art as the oxidation of carbon monoxide to form carbon dioxide. Typically, the reaction which takes place when coke is burned from a spent catalyst results in the formation of carbon dioxide and carbon monoxide from carbon in the coke and water from the hydrogen in the coke. The temperature limits of equipment within most regeneration zones generally prevents any substantial secondary conversion of carbon monoxide to carbon dioxide. Most refineries utilizing regeneration apparatus such as fluidized catalytic cracking regenerators have one or more carbon monoxide boilers attached to the flue gas stream following regeneration zone to generate steam from the heat liberated in the afterburning of carbon monoxide while reducing, if not substantially eliminating, the quantity of carbon monoxide passed into the atmosphere. With the advent of stricter regulations relating to the control of emissions from refineries and the ever present goal of improving the economics of processing, afterburning within a regeneration zone is now considered desirable. The afterburning, in addition to allowing an exothermic reaction to take place, can substantially eliminate the extent of carbon monoxide admitted to the atmosphere.

Typically, the mechanical limitations when afterburning is attempted are that most metals utilized in present regeneration apparatus cannot sustain temperatures in excess of about 1300° F. and consequently are not designed to allow after burning within the apparatus. An additional problem associated with afterburning is the recovery of the heat of reaction of carbon monoxide to carbon dioxide within the apparatus so that the heat may be utilized within the process. In order to recover this potential chemical heat, the afterburning must take place in the presence of catalyst so that the catalyst may recover the heat of reaction of the carbon monoxide oxidation and, in a fluid cracking process, transport this chemical heat to the hydrocarbon reaction zone for improved process thermal efficiency. It is also necessary to prevent the occurrence of extremely high temperature hot spots within the regeneration apparatus. The hot zones will occur if afterburning is accomplished without the presence of catalyst as a heat transfer medium.

Our invention allows the refiner to utilize afterburning in a system which prevents damage to equipment, allows high recoveries of the heat of reaction of carbon monoxide oxidation by the regenerated catalyst, and substantially eliminates carbon monoxide emissions to the atmosphere while totally eliminating the need for carbon monoxide steam boilers. Some of the advantages associated with being able to increase the temperature of the regenerated catalyst are that the reactor temperature can be substantially increased thereby allowing shorter contact times to obtain a desired conversion of hydrocarbon feed, which we have found additionally increase product yields when gasoline and valuable light components are desired or less coke may be made in the process because of decreased catalyst circulation rate resulting from the increased catalyst temperature.

Specific prior art which we have reviewed and found to be related to the present invention include U.S. Pat. 3,161,583 having as its inventor J. B. Pohlenz (Class 208–164), U.S. Pat. 3,494,858 having as its inventor E. C. Luckenbach (Class 208–164) and U.S. Pat. 3,563,911 having as its inventors R. W. Pfeiffer and L. W. Garrett (Class 252–417). These patents all relate to processing conditions and flow schemes used in present day fluidized catalytic cracking regeneration zones but are also applicable to any type regeneration zone to which a spent catalyst containing coke is passed.

The specific purpose of U.S. Pat. 3,161,583 is to offer a process for regeneration in which, among other things, an oxygen containing stream passed into the regenerator is controlled by the difference between the dense bed temperature and the dilute phase temperature within a regeneration zone. Specifically, the rate of regeneration gas passed into the regeneration zone in this patent is controlled to substantially, if not totally, eliminate afterburning while allowing the dense bed within the regeneration zone to be maintained at a reasonably high level.

U.S. Pat. 3,494,858 claims what is referred to as countercurrent regeneration techniques illustrates and discloses general apparatus which can be used to effectuate the process claims. Specifically, the regeneration apparatus can include two stage regeneration in which partially regenerated catalyst is contacted with fresh regeneration gas and then passed into a final regeneration zone. The partially spent regeneration gas leaving this mixture then contacts partially regenerated catalyst which contains a higher level of coke than the fully regenerated catalyst. The essential two step regeneration technique allows more coke to be removed from a spent catalyst because the incremental amount of coke removed in each stage is lower. By using incremental steps in reducing the coke content on the spent catalyst the catalyst particle does not approach temperatures which would normally be approached if all the coke was attempted to be removed in one step.

U.S. Pat. 3,563,911 claims a two step regeneration process in which coke is removed from a catalyst in separate steps, again to prevent excessively high catalyst particle temperatures which would normally be associated if the same amount of coke was removed from the catalyst in a single step. That patent at column 4 beginning at line 57 mentions afterburning control within the regeneration process. Specifically, the afterburning taking place occurs in the upper portion of the regeneration zone which is inherently the dilute phase portion. We have found the dilute phase portion to be very susceptible to damage should uncontrolled afterburning take place, since in this area there is no appreciable heat sink present to remove the heat generated by the afterburning taking place in the dilute phase. Consequently, the heat is transferred to the flue gas and eventually to the apparatus itself causing damage in many instances. This patent does mention that some of the catalyst passing into the cyclones in the top of their regeneration zone can recover heat and can carry it back to the dense bed, however such a minimal amount of catalyst generally present in the dilute phase as to present a negligible heat sink for the recovery of the heat from the carbon monoxide afterburning.

Our apparatus allows controlled afterburning in the presence of substantial quantities of catalyst. In fact, our apparatus provides a zone in which afterburning can take place in the presence of large quantities of catalyst.

SUMMARY OF THE INVENTION

Our invention can be briefly summarized as a catalyst regeneration apparatus comprising in combination: a spent catalyst receiving chamber; a regenerated catalyst receiving chamber; a transfer conduit having an inlet and an outlet which conduit connects said chambers; catalyst inlet and fresh regeneration gas inlet means which are connected to the spent catalyst receiving chamber and catalyst outlet and spent regeneration gas outlet means which are connected to the regenerated catalyst receiving chamber; and a combustion inlet means which is connected to the transfer conduit.

A broad embodiment of our invention reside in a catalyst regeneration apparatus for oxidizing coke on a spent catalyst comprising in combination:

(a) a spent catalyst receiving chamber;

(b) a regenerated catalyst receiving chamber;

(c) a transfer conduit having an inlet and outlet, said inlet connected to said spent catalyst chamber and said outlet connected to said regenerated catalyst chamber, said conduit positioned to carry catalyst and regeneration gas from said spent chamber to said regenerated catalyst chamber;

(d) catalyst inlet and fresh regeneration gas inlet means connected to said spent catalyst chamber to allow passage of spent catalyst and fresh regeneration gas respectively into said chamber;

(e) catalyst outlet and spent regeneration gas outlet means connected to said regenerated catalyst chamber to allow passage therethrough of regenerated catalyst and spent regeneration gas from said chamber; and (f) combustion gas inlet means connected to said transfer conduit to allow passage of combustion gas into said conduit.

BRIEF DESCRIPTION OF THE DRAWINGS

The drawings included in this specification include FIG. 1 which describes a general embodiment of the apparatus of our invention, FIG. 2 which depicts a specific embodiment of our apparatus, and FIG. 3 which depicts another alternate embodiment of the apparatus of our invention.

Transfer conduit 2 is preferably vertically disposed having its inlet at its lower portion and its outlet means 12, 12' located near its top portion. Outlet means 12, 12' may be openings located at the uppermost or near the uppermost portion of conduit 2 which allow catalyst and regeneration gas passing through volume 19 within conduit 2 to pass out of the conduit and into the regenerated catalyst receiving chamber. The inlet of the transfer conduit FIG. 1 is labeled 18 as is the outlet of the spent catalyst receiving chamber since they are in communication with each other.

Figure 1:
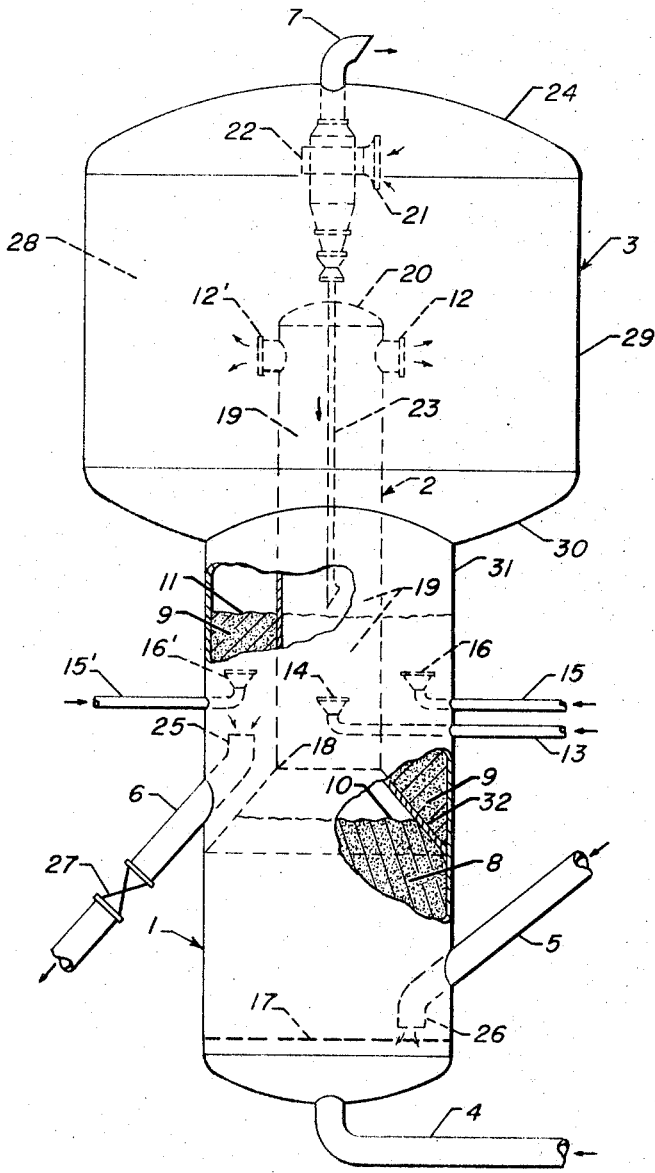
FIG. 1 shows the broad embodiment of the apparatus of this invention. Spent catalyst receiving chamber 1 is shown at the lower portion of the figure. Transfer conduit 2 is connected to the spent catalyst receiving chamber having outlets 12, 12' emptying into a regenerated catalyst receiving chamber 3. Attached to spent catalyst receiving chamber 1 are shown spent catalyst inlet means 5 and fresh regeneration gas inlet means 4. These two means are typically conduits connected to the spent catalyst receiving chamber. Spent catalysts inlet conduit 5 can pass into spent catalyst receiving chamber 1 passing through its walls and extending as shown by extension 26 into the chamber to allow a better distribution of spent catalyst passing into the spent catalyst receiving chamber. Within chamber 1 there is located an optional grid 17 which allows the fresh regeneration gas passing into chamber 1 via line 4 to be more readily dispersed within catalyst bed 41 located within chamber 1. Typically the grid can comprise slots or holes in a metal plate or pipe grids which allow a better distribution of fluid within a bed of fluidized particles. Spent catalyst receiving chamber 1 has an outlet labeled 18 which is located preferably at the top of the chamber. Outlet 18 carries a regeneration gas and fluidized catalyst stream (catalyst entrained in generation gas) out of spent catalyst receiving chamber 1 and into the transfer conduit 2.

Located within volume 19 within conduit 2 is the combustion gas inlet means 13. This means can carry combustion gas into void space 19 located within transfer line conduit 2 to be combusted with regeneration gas passing through the conduit and in contact with catalyst which also passes through conduit 2. Optional distribution means 14 can be used to help distribute combustion gas across the cross-sectional area of the transfer conduit 2.

Optionally at the top of transfer conduit 2 there is a cap labeled 20 which blocks off the top of the transfer conduit to prevent catalyst entrained regeneration gas from passing out of the conduit in an upward direction. It is preferred that the catalyst entrained regeneration gas passing out of outlets 12 and 12' of the transfer conduit be in a horizontal or in a downward direction to prevent excess entrainment of catalyst in the gases within the dilute phase 28 within regenerated catalyst receiving chamber 3.

Regenerated catalyst receiving chamber 3 contains the dilute phase volume 28 and the dense bed volume 9. Specifically, the regenerated catalyst receiving chamber is defined at its uppermost portion by dome 24, by sidewalls 29, by swedged wall 30, vertical wall 31, swedged wall 32, and the outer face of transfer conduit 2. The regenerated catalyst receiving chamber contains catalyst outlet means 6 and spent regeneration gas outlet 7. The catalyst outlet conduit 6 is connected to the regenerated catalyst receiving chamber 3 and passes through one of its side walls. Optional piping 25 may be located within the regenerated catalyst receiving chamber to allow a better distribution of material being removed from the regenerated catalyst receiving chamber. Also located on catalyst outlet means 6 is valve 27 which may be used to control the rate of withdrawal of catalyst from the regenerated catalyst receiving chamber. Typically valve 27 is a slide valve and is operated by a controller which bases its signal on reactor temperature or the differential pressure maintained in a reaction zone.

Spent regeneration gas outlet means 7 is connected to separation means 22 which typically is a cyclone separation means. Separation means 22 has an inlet 21 which receives spent regeneration gas and any entrained catalyst located within the dilute phase volume 28 within the regenerated catalyst receiving chamber. Spent regeneration gas and any entrained catalyst are substantially separated from each other with the spent regeneration gas passing out of the chamber 3 and separation means 22 via spent regeneration gas outlet 7. Catalyst separated from the spent regeneration gas is passed via dipleg 23 and eventualy goes to the dense bed 9 located within the regenerated catalyst receiving chamber.

Located within the regenerated catalyst receiving chamber are optical inlet means 15 and 15' which have optional distribution means 16 and 16' located at their outlet points. Inlet means 15 and 15' can carry an oxygen containing gas in order to induce additional afterburning within dense bed 9 within the spent regenerated catalyst receiving chamber 3 or can contain a stream of steam or other inert gas which can be used to purge the catalyst in dense bed 9 of oxygen-containing components prior to its being removed via regenerated catalyst conduit 6. Inlet means 15 and 15' can alternately be utilized to effect passage of an oxygen bearing gas stream into the dense bed and also to pass a stripping stream into the dense bed. In such instances one of the inlet means 15 or 15' can be located above the other with the uppermost inlet means passing the oxygen bearing gas into the dense bed 9 while the lowermost inlet means passes a stripping stream into the dense bed 9.

Located within the apparatus described are two dense beds. Dense bed 8 is primarily spent catalyst which is passed into the lower chamber 1 via conduit 5 and contains a relatively high percentage of coke present thereon. This dense bed will have a top level which is at the exact point where the regeneration gas reaches transport velocity. Since there is a transition zone between the first dense bed 8 and riser 2, then the level will lie in the transition zone near wall 32. This dense bed 8 is maintained within chamber 1 and is preferably below its outlet 18. The dense bed 8 is maintained within the spent catalyst receiving chamber 1 in order to allow enough contact time of the spent catalyst with fresh regeneration gas which passes via conduit 4 into the dense bed 8. Transfer conduit 2, as shown, has a preferably smaller cross-sectional area than chamber 1 so that regeneration gas passing out of lower chamber 1 via its outlet 18 is substantially increased in velocity to cause entrainment of catalyst from dense bed 1 into volume 19 located within transfer conduit 2. Preferably volume 19 contains dilute phase of catalyst entrained regeneration gas. Specifically, the flow of both gas and catalyst is concurrent with some slippage occurring because of this inherency in vertical lift systems. A combustion zone located within a certain defined portion of volume 19 within conduit 2 causes additional combustion to take place within that zone. In one instance an oxygen-bearing gas passes through combustion gas inlet means 13 through distribution device 14 and causes oxidation of carbon monoxide which is present within transfer conduit 2 to be burned to carbon dioxide. The heat liberated from this reaction is transferred to the catalyst which is entrained within the transfer conduit 2. In an alternate embodiment a combustible gas such as methane, hydrogen, or ethane can pass through combustion gas inlet means 13 into conduit 2 to offer additional heat input into the unit to increase the temperature of the catalyst particles passing through transfer conduit 2.

The second dense bed within the apparatus is dense bed 9 which is located and maintained with the regenerated catalyst receiving chamber. This second dense bed is required in order to maintain sufficient head on the regenerated catalyst passing through line conduit 6 to overcome any pressure drop in that line or in equipment downstream on that line, and additionally, to provide enough dense bed of regenerated catalyst so that stripping of oxygen containing materials from the catalyst particles themselves and/or interstitial void spaces between the catalyst particles can occur if desired to prevent carryover of oxygen materials into a reaction zone. In FIG. 1 the height of the dense bed 9 can vary but preferably should be below the outlets 12 and 12' of the transfer conduit 2 so there is no spill back of dense phase material from dense bed 9 into transfer conduit 2. In the embodiment shown in FIG. 1, some heat transfer can occur along transfer conduit 2 between the dense bed 9 which is in intimate contact with that conduit and the material being combusted within the vicinity of distributing means 14 within transfer conduit 2.

Figure 2:
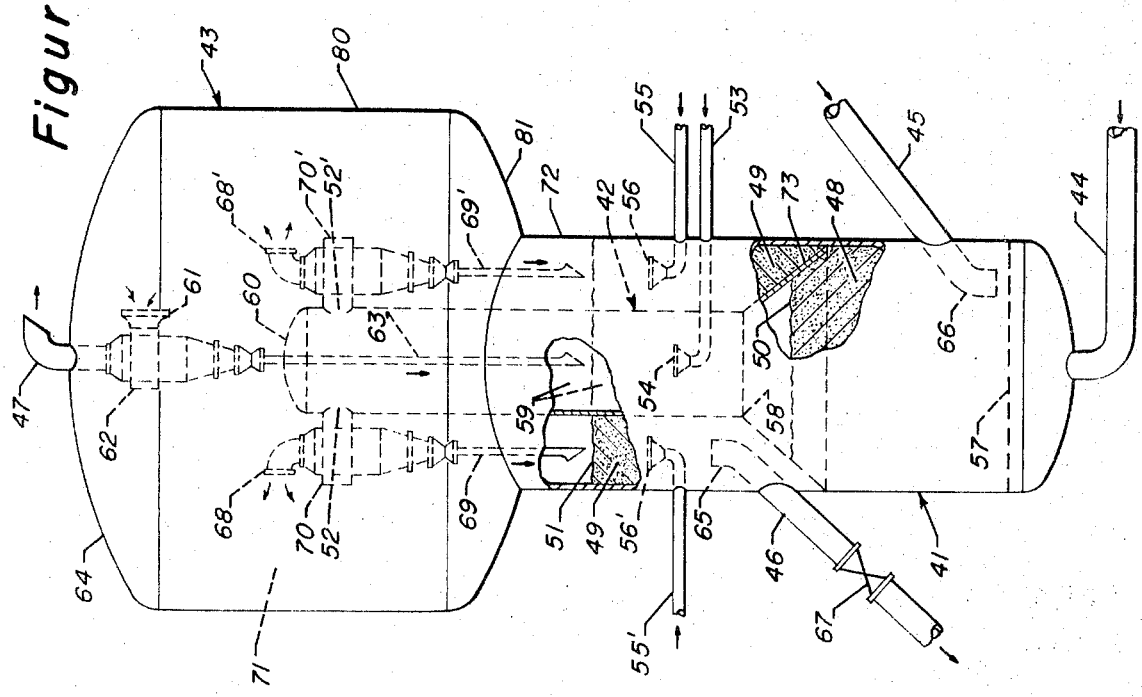

FIG. 2 shows a specific embodiment of the apparatus of our invention. FIG. 2 is essentially the same structure as FIG. 1 with the exception that catalyst and regeneration gas separation means 70 and 70' are attached to the outlets 52 and 52' of transfer conduit 42. Separation means 70 and 70' are utilized to effectuate a substantial separation of regeneration gas and entrained catalyst which pass out of conduit 42 so that the material present in dilute phase volume 71 is essentially spent regeneration gas with very little entrained catalyst present in this volume. The addition of the catalyst and regeneration gas separation means 70 and 70' can improve the performance of the apparatus claimed when relatively high throughputs of both regeneration gas and regeneration catalyst occur in the apparatus. Entrained catalyst and regeneration gas passed via inlet and outlet 52 and 52' into the separation means 70 and 70' where regenerated gas which is substantially free of catalyst passes out of separation means through outlets 68 and 68' while catalyst passes through diplegs 69 and 69' and eventually into dense bed 49. The diplegs may go below the interface 51 located between dilute phase 71 and dense bed 49.

Portions of FIG. 2 which are similar to the portions of FIG. 1 except their numerical differences function in essentially the same way as described for FIG. 1. Briefly spent catalyst receiving chamber 41 has a spent catalyst inlet means 45 with an optional extension 66 which allows spent catalyst to be passed into chamber 41. Fresh regeneration gas passes through inlet means 44 past optional grid 57 located within chamber 41. Chamber 41 has outlet 58 which is located preferably at the uppermost portion of that chamber and contains a dense bed 48 with its interface 50 located preferably below the outlet 58 of chamber 41.

Transfer conduit 42 which is preferably vertically positioned has its inlet 58 superimposed upon the outlet 58 of chamber 41 and its outlets 52 and 52' substantially superimposed upon the inlets of separation means 70 and 70'. Located within transfer conduit 42 is volume 59 which can be described as a combustion zone located between the lower portion and the upper portion of conduit 42. Combustion gas inlet means 53 passes into transfer conduit 42 and has an optional distribution means 54 located thereon. The combustion zone can be defined as the volume within transfer conduit 42 in which combustion gas and regeneration gas chemically react and is preferably confined to the volume located between the inlet 58 of conduit 42 and its outlet. Cap 60 is preferably located at the top of conduit 42 to offer a suitable volume above outlets 52 and 52' to allow a cushion of catalyst to be present within the volume formed by cap 60 to prevent undue attrition at the top of the conduit.

Regenerated catalyst receiving chamber 43 contains a dilute phase 71 and a dense bed 49 which are separated by interface 51 which is preferably located in a lowermost portion of chamber 43. A spent regeneration gas outlet means 47 is connected to chamber 43 as is a regenerated catalyst outlet line 46 with its optional inlet distribution means 65. Optionally located on conduit 46 is slide valve 67 which can be used to control the rate of regenerated catalyst removed from the apparatus. Inlet means 55 and 55' together with their associated optional distribution means 56 and 56' can be used to carry oxygen-containing gas into the dense bed 49 to allow additional afterburning to take place within the dense bed or can be used as a stripping stream inlet means in which an inert hydrocarbon is passed into dense bed 49 to remove oxygen-containing components from the catalyst or interstitial void spaces between the catalyst particle. Optionally two or more sets of inlet means 55 and 55' can be utilized to function both to introduce an oxygen-containing gas in the upper portion of dense bed 49 to allow additional afterburning to take place and to allow the introduction of a stripping stream into the lower portion of dense bed 49 to allow stripping of oxygen bearing materials from the catalyst.

Separation means 62 allows substantial separation of spent regeneration gas from entrained catalyst which passes into separation means 62 via inlet 61. Catalyst separated from spent regeneration gas passes through dipleg 63 and eventually into dense bed 49. The spent regeneration gas passes out of chamber 43 via conduit 47. As shown chamber 43 is made up of a top surface 64 together with sides 80, shoulder wall 81, side wall 72, bottom shoulder 73 and the outside portion of transfer conduit 42. The control levels in both chambers depends on essentially the same factors and control means as described in FIG. 1.

Figure 3:
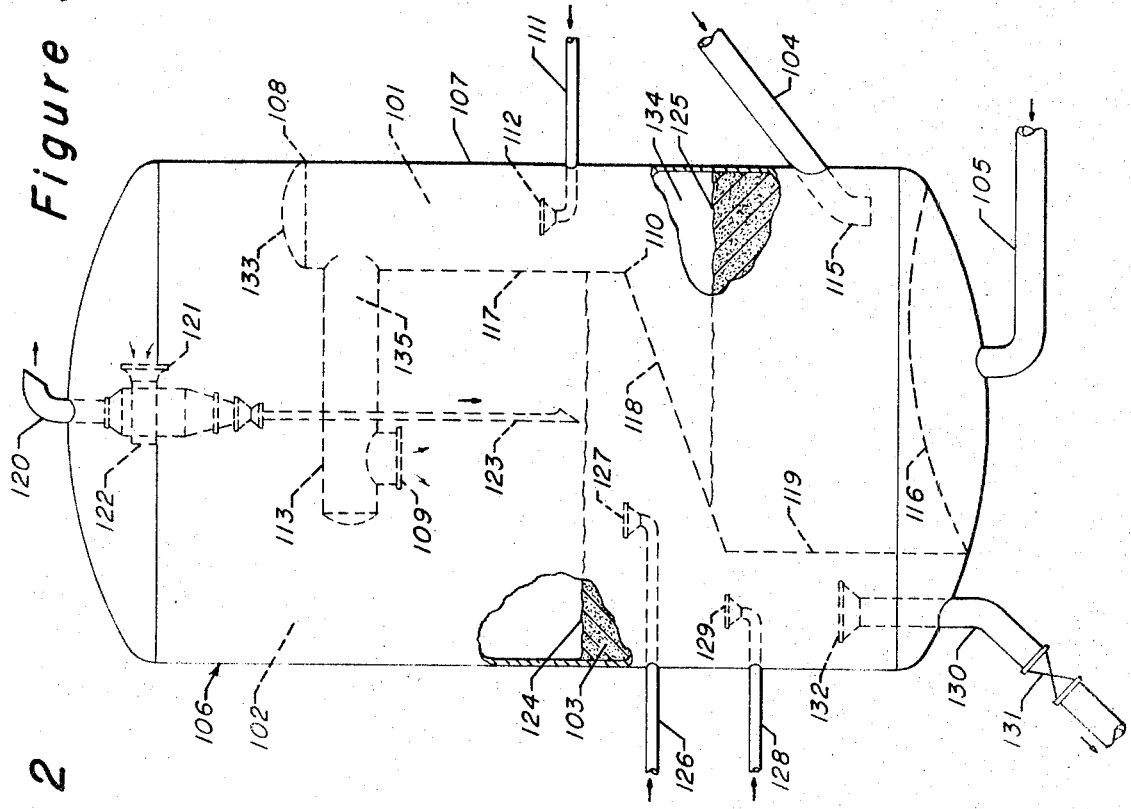

FIG. 3 shows an alternate embodiment of the apparatus claimed. Specifically, FIG. 3 represents a modification of existing regenerators which can be performed to construct the apparatus of our invention. In FIG. 3, a normal regeneration vessel 106 is modified by the addition of walls 119, 118, 117, cap 133, horizontal conduit 113, and outlet means 109. Specifically, the aforementioned walls and conduits and caps can be constructed to seal off a portion of the volume of the original regenerator 106 to form a spent catalyst regeneration chamber, a transfer conduit, and a regenerated catalyst receiving chamber. In FIG. 3, the volume located below segment 110 which includes the volume occupied by dense bed 104 and dilute phase volume 134 comprises the spent catalyst receiving chamber. Volume 101, which is that volume defined by the volume above points 110 and including the volume 135 within the horizontal conduit 113 comprises the transfer conduit. Remaining volume 102 and 103 comprises the regenerated catalyst receiving chamber.

Typically the spent catalyst receiving chamber is totally segregated from the regenerated catalyst receiving chamber except for the connection between those two chambers by transfer conduit 101.

The spent catalyst receiving chamber has spent catalyst inlet means conduit 114 with its optional distribution conduit 115 passing into it. Fresh regeneration gas passes through regeneration gas inlet means 105 to be passed by optional grid 116 which allows better distribution of regeneration gas within dense bed 104. Regeneration gas and entrained catalyst pass out of spent catalyst receiving chamber past outlet 110 and into the inlet which is also labeled 110 of transfer conduit volume 101 and 135. Entrained catalyst and regeneration gas then pass out of transfer conduit volume 101 and 135 via transfer conduit outlet means 109. Within transfer conduit volumes 101 and 135 there is located a combustion zone which is adjacent to combustion gas inlet means 111 with its optional distribution means 112. Combustion gas passes through combustion gas inlet means 111 to cause either oxidation of carbon monoxide within the transfer line conduit volume 101 and 135 or the oxidation of a combustible gas which may also pass through combustion inlet means 111. After combustion or afterburning or both has taken place within volumes 101 and 135, entrained catalyst and regeneration gas pass out of the transfer line via outlet means 109 and into regenerated catalyst receiving chamber volume 102 and 103. As shown in the drawing, outlet means 109 preferably is placed so that it ejects entrained catalyst and regeneration gas in a downward direction to reduce the extent of catalyst entrained within the dilute phase volume 102 of the regenerated catalyst chamber. Separation means 122 allows the separation of any entrained catalyst located within dilute phase volume 102 from spent regeneration gas located within that volume. Entrained catalyst and spent regeneration gas pass via inlet 121 into separation means 122 where spent regeneration gas passes out of the apparatus via regeneration gas outlet conduit 20 with entrained catalyst separated from the regeneration gas passing via dipleg 123 and eventually go into the dense bed volume 103 of the regenerated chamber. Also connected to the regenerated catalyst receiving chamber is catalyst outlet conduit 30 with this optional distribution means 132 and control valve 131 which controls the removal rate of regenerated catalyst from the apparatus. Optional inlet means 126 and 128 are located within dense bed volume of the regenerated catalyst receiving chamber. Preferably inlet means 126 can carry an oxygen-bearing gas into dense bed 103 volume through an optional distribution means 127 to cause further afterburning of carbon monoxide within the dense bed 103. Inlet means 128 can carry a stripping stream into dense bed 103 which can comprise steam or an inert gaseous material or light hydrocarbon which can remove oxygen-containing materials from the interstitial void spaces and the catalyst particles themselves before the catalyst material is removed from the apparatus via outlet conduit 130. Optionally, a stripping stream can be incorporated in conduit 130 rather than in regenerated catalyst receiving chamber.

DETAILED DESCRIPTION OF THE INVENTION

Our apparatus can briefly be described as an apparatus containing a spent catalyst receiving chamber and a regenerated catalyst receiving chamber which chambers are connected by a transfer conduit which contains a combustion zone. Essentially initial oxidation of coke present on spent catalyst passed into spent catalyst receiving chamber takes place in that chamber with generation of some carbon monoxide by the oxidation of coke. Products of the coke combustion together with unused regeneration gas and entrained catalyst pass from the spent catalyst receiving chamber into the combustion zone located within the transfer conduit wherein alternatively carbon monoxide oxidation or afterburning take place in the presence of entrained catalyst, or a combustion gas can be passed into the combustion zone to increase the temperature of the catalyst by the oxidation of the combustion gas. The heated catalyst together with essentially spent regeneration gas leave the transfer conduit and pass into the regenerated catalyst receiving chamber to eventually be separated and removed from that chamber as a regenerated catalyst stream and a spent regeneration gas stream.

The spent catalyst receiving chamber is a vessel which receives catalyst containing coke and which is deemed to be inactive enough to require regeneration. Typically spent catalyst passing into the spent catalyst receiving chamber contain anywhere from a few tenths up to a few percent by weight of coke. More preferably a spent catalyst should contain from about .5 up to about 3 wt. percent coke. In fluidized catalytic cracking operations the spent catalyst removed from the reactor generally contains from about 0.5 to about 1.5 wt. percent cotton.

The regenerated catalyst removed from a regenerated catalyst receiving chamber should contain a lower quantity of coke than the spent catalyst passed into spent catalyst receiving chamber. Typically, the regenerated catalyst contains less than about 0.4 wt. percent of coke and preferably and in fluidized catalytic cracking operations contains less than about .3 and sometimes as little as less than .1 wt. percent coke. In the claims and in this specification, the essential difference between regenerated catalyst and spent catalyst is that the regenerated catalyst shall contain a lower average quantity of coke than spent catalyst. In some instances in which the apparatus of our invention is utilized to both burn carbon monoxide and control the coke level on regenerated catalyst the coke level on the regenerated catalyst leaving regenerated catalyst receiving chamber may be as high as .5 wt. percent the catalyst and in some instances may approach 1.0 wt. percent coke on the catalyst.

The upper and lower sections of the spent catalyst receiving chamber refer to general areas of that chamber. Specifically, the upper section is the top portion of that chamber which is connected to the inlet of the transfer conduit. The lower section is typically the bottom of the chamber and is the area into which the fresh regeneration gas passes.

The term regeneration gas as used in the claims and in this specification shall mean, in a generic sense, a gas stream selected from air, regenerator flue gas or any gas which is to or has contacted catalyst whether it be in the spent catalyst receiving chamber, the transfer conduit, or the regenerated catalyst receiving chamber. Specifically, the term fresh regeneration gas shall include oxygen-bearing gases such as air or oxygen enriched air streams which pass into the spent catalyst receiving chamber to allow oxidation of coke on the spent catalyst therein. Partially spent regeneration gas shall refer to regeneration gas which has contacted the dense bed maintained in the spent catalyst receiving chamber and typically which contains a reduced quantity of reactive free oxygen in the gas. Typically the partially spent regeneration gas contains water, nitrogen, some oxygen, carbon monoxide, and carbon dioxide. Spent regeneration gas shall include regeneration gas which contains little carbon monoxide and may contain little or no oxygen or a slight excess of free oxygen of generally from about a few tenths up to as much as 10 mole percent free oxygen. Typically, the spent regeneration gas stream is the stream removed from the regenerated catalyst receiving chamber and as used in the art referred to as carbon monoxided efficient flue gas.

Combustion gas shall include oxygen containing gases such as air or gases which contain combustible material such as hydrogen or light hydrocarbons. Typically combustion gas passes through the combustion gas inlet means which is connected to the transfer conduit that conditions to allow combustion in the transfer conduit. The term combustion shall refer to those instances in which carbon monoxide which is present in the transfer conduit is contracted with oxygen which passes through the combustion gas inlet means to cause further oxidation of the carbon monoxide (afterburning) thereby releasing heat and causing the catalyst entrained in regeneration gas in that conduit to increase in temperature. In instances in which the combustion gas is a combustible material such as hydrogen, methane, or ethane, etc., the combustion which takes place in the transfer conduit is of the combustion gas. Specifically in instances in which a combustible gas passes into the transfer conduit, the combustion taking place in the transfer conduit is generally for the purposes of increasing the temperature of the entrained catalyst in a transfer conduit, and not necessarily for the oxidation of carbon monoxide therein. Typically, when a combustible gas is burned in the transfer conduit as a result of a combustion gas such as hydrogen, methane, ethane, etc., being passed through the combustion gas inlet means most all of the carbon monoxide formed from the oxidation of coke in the spent catalyst receiving chamber has been oxidized to carbon dioxide with the afterburning taking place in the dense bed within the spent catalyst receiving chamber.

In instances in which carbon monoxide is oxidized in a transfer conduit, there would be some circumstances in which partial oxidation of carbon monoxide takes place and additional oxygen containing combustion gas may be passed into the dense bed maintained in the regenerated catalyst receiving chamber. In those instances, afterburning will occur in two or more places within the apparatus, namely afterburning within the dense bed within the spent catalyst receiving chamber, afterburning within the transfer conduit, or afterburning in the catalyst located within the regenerated catalyst receiving chamber. Our apparatus typically is designed to allow afterburning in a transfer conduit and in the regenerated catalyst receiving chamber although afterburning may take place in both chambers and in the transfer conduit. Preferably afterburning is confined to the transfer conduit.

The relative sizes of two chambers and the transfer conduit are extremely important in order to maintain dense beds of catalyst in the chambers and concurrent catalyst and regeneration gas flow in the transfer conduit. In order to maintain a dense bed of catalyst in the chambers, it is necessary that their cross-sectional areas be such that the superficial gas velocity up through the chambers is low enough to maintain the bed of catalyst in the chamber for sufficient time to burn coke from catalyst. The transfer conduit is typically vertically positioned and has a cross-sectional area in the horizontal direction much smaller than cross-sectional area of the spent catalyst receiving chamber in order to allow gas velocities traveling through the transfer conduit to be high enough so that catalyst can be carried from the spent catalyst receiving chamber through the transfer conduit and into the regenerated catalyst receiving chamber. Typically, the cross-sectional areas of this vessel should be such that superficial gas velocities for normal regeneration operations exceed 10 ft. per second. The addition of combustion gas to the combustion means in the transfer conduit can increase the superficial gas velocity through the transfer conduit. The length of the transfer conduit is important. It should be long enough in order to contain the combustion of carbon monxide or combustible gas within the conduit allowing enough residence time of catalyst and gases for adequate transfer of heat from the gas into the entrained catalyst to thereby increase the particle temperature of the entrained catalyst.

The regenerated catalyst receiving chamber is typically of such design that suitable volume is present within this chamber to prevent undue entrainment of catalyst in the upper portion of this chamber. Of course, economics can enter into the picture when the regenerated receiving chamber is of such immense design that very small superficial gas velocity occur. In the lower portion of the regenerated catalyst receiving chamber, it is desired that its cross-sectional area of volume be relatively small in order that a dense bed of catalyst will be able to be built up within the chamber with a minimum catalyst time in this section since the catalyst at this point is hottest in the system. Typically, the regenerated catalyst receiving chamber has a smaller cross-sectional area at its lower portion as compared to the cross-sectional area near its upper portions. In instances in which the regenerated catalyst receiving chamber is located in a manner such that the transfer conduit is projected into the regenerated catalyst receiving chamber passing through the bottom of the chamber and into it, the desired reduction in cross-sectional area at the bottom of the chamber is accomplished. The upper portion of the chamber into which the transfer conduit does not project has a large cross-sectional area which can reduce the superficial gas velocity in that portion to prevent catalyst entrainment in the upper portion of that chamber.

The regenerated catalyst receiving chamber can also include a stripping chamber which is connected to the outlet of the transfer conduit directly or via another chamber. Typically, when an external stripping zone is used, it is a separate vessel which is connected to the vessel (if any), connected or in communication with the outlet of that transfer conduit. In these instances, the regenerated catalyst receiving chamber shall include the stripping zone and the other vessel which connects the stripping zone to the transfer conduit outlet.

The considerations used in designing an apparatus to fall within our claimed invention should be such that spent catalyst which is passed into the spent catalyst receiving chamber and fresh regeneration gas can be contacted in that chamber for anywhere from 5 to about 200 seconds. The transfer conduit which is connected to the spent catalyst receiving chamber should be long enough and have sufficient cross-sectional area to allow entrainment of catalyst in the gases passing through that conduit and to allow in instances in which afterburning should take place in that conduit from about 2 to about 20 seconds of contact time between catalyst in this riser conduit and the carbon monoxide being oxidized in order that the catalyst may "soak" up a maximum quantity of chemical heat liberated by the heat of reaction of the carbon monoxide being oxidized to carbon dioxide. The regenerated catalyst receiving chamber should be designed to have a volume in which flue gas or spent regeneration gas is present within this chamber anywhere from a few seconds up to about 200 or more seconds. In particular, the lower portion of the regenerated catalyst receiving chamber should be of sufficient cross-sectional area to allow the contact times of catalyst and combustion gas when secondary afterburning is desired in the dense bed which is maintained in the lower portion of this chamber anywhere from about 2 to about 50 seconds. In general, the catalyst time in the second dense bed will be kept at a minimum so as to prevent prolonged times at the higher temperature.

Generally, the design of the apparatus disclosed including the spent catalyst receiving chamber, the transfer conduit, and the regenerated catalyst receiving chamber are such that spent catalyst receiving chamber is located at essentially the lower portion of the apparatus configuration while the regenerated catalyst receiving chamber is typically placed at the uppermost portion of the apparatus. Connecting the upper chamber to lower chamber is done by the transfer conduit which preferably is vertical in positioning and connecting the two chambers. In a preferred design, a spent catalyst receiving chamber is a roughly cylindrical volume having a catalyst outlet through which catalyst which is entrained with regeneration gas passes out of the top of the chamber into a vertical elongated conduit which itself is connected to the regenerated catalyst receiving chamber. The regenerated catalyst receiving chamber can be cylindrical in nature but preferably is "mushroom shaped" having its narrow stem portion placed over the vertical transfer conduit in order to enable a smaller cross-sectional area to be achieved in its lower portion. Its larger upper portion generally contains within it the outlet of the vertical transfer conduit and has sufficient volume to prevent excess entrainment of regenerated catalyst in this portion of the regenerated catalyst receiving chamber to effectively enhance the ability of a cyclone separation means which can be located in the upper portion of this chamber to separate entrained catalyst from spent regeneration gas. Specifically, in FIGS. 1 and 2 this preferred description is disclosed.

The materials of construction for building our apparatus include materials sufficiently able to withstand the high attrition conditions which are inherent in systems in which fluidized catalyst is regenerated and transported and are able to withstand the higher temperatures involved when afterburning is attempted within a vessel. Specifically, metals are contemplated and may or may not be lined. Specifically, ceramic liners are contemplated within any or all portions of the apparatus together with alloy use and structural designs in order that the spent catalyst receiving chamber can withstand constant 1400° F. temperatures and also be able to withstand, for a reasonably short period of time, temperatures which may be as high as 1500° F. or 1600° F. Specifically, the vertical transfer conduit should also be designed to be able to withstand such high temperatures sustained operations of roughly 1400° F. on the average, but in many instances in which low quantities of entrained catalyst are present in the conduit or during unit upsets, the conduit should be able to withstand temperatures as high as 1550° F. or 1600° F. The regenerated catalyst receiving chamber should be designed to withstand constant 1400° F. temperatures of gases which pass into it and in many instances should be designed for a reasonably long period of time temperatures in excess of 1400° F. and typically in the range of about 1400° F. to about 1600° F. or higher.

The pressures which the entire apparatus are contemplated to withstand are from about normal atmospheric up to about 50 p.s.i.g. or higher. It is preferred, however, to design an apparatus which can withstand pressures within about 100 p.s.i.g. Most regeneration apparatus which presently utilize non-afterburning techniques are designed to withstand pressures from about 10 to about 40 p.s.i.g. which is the preferred range of operations of the process performed within this apparatus.

Catalyst inlet and fresh regeneration gas inlet means which are connected to the spent catalyst chamber typically are conduits which carry the respective fresh regeneration gas and the spent catalyst from a reaction zone into that chamber. Typically, these inlet means are conduits which may contain distribution devices located on their outlets within the chamber to allow distribution of spent catalyst or fresh regeneration gas within the dense bed within that chamber to promote efficient combustion of coke upon the catalyst, and when desired, some or total afterburning within the dense bed. Preferably, the fresh regeneration gas inlet is connected to or passes through a grid located in the bottom of the chamber to allow distribution of fresh regeneration gas within the dense bed. Catalyst outlet and spent regeneration gas outlet means which are connected to the regeneration gas chamber typically are designed to remove spent regeneration gas or flue gas from that chamber along with regenerated catalyst. The regenerated catalyst outlet means connected to that chamber may contain stripping inlet means attached thereto or attached to the chamber to allow the purging of any oxygen components adsorbed within the catalyst or present within the interstitial void spaces between the catalyst particles before these materials pass through the regenerated catalyst outlet and into a contemplated reaction zone. This use in this type of apparatus to prevent oxygen from passing into the reaction zone wherein oxidation of reactants could occur possibly endanger operating personnel should the oxidation of hydrocarbons in the reaction zone become uncontrolled. This stripping is also used to cut quantity of combustion products going to the reactor. These products are not condensed in the main column overhead and therefore cost money to pump throughout the gas concentration section. Typically, the regenerated catalyst outlet contains a valve such as a slide valve which is able to regulate a rate of flow of catalyst therethrough in order to supply desired needs of fresh catalyst to a reaction zone. Typically, this regenerated catalyst outlet means is located near the bottom portion of the regenerated catalyst receiving chamber and below the innerface between the dilute phase and dense bed within that chamber in order to allow a sufficient head of catalyst above the regenerated catalyst outlet in order to overcome the pressure drop within the conduit and related slide valve to induce flow through the outlet.

One or more catalyst-regeneration gas separation means may be utilized within the apparatus to separate regeneration gas found in entrained catalyst. Typically and in a preferred embodiment, the catalyst regeneration gas separation means is connected to the outlet transfer conduit to receiving catalyst entrained in regeneration gas and separate catalyst from the regeneration gas. The outlet of such a separation means can pass catalyst which has been essentially separated from regeneration gas into the dense bed located within the regenerated catalyst receiving chamber and regeneration gas essentially free of entrained catalyst into that chamber. A catalyst-regeneration gas separation means may also be connected to the spent regeneration gas outlet means within regenerated catalyst receiving chamber.

Typically, the catalyst-regeneration gas separation means are cyclone separators whose design and construction is well known in the art. One or more of these cyclones may be utilized in parallel or in series flow on the transfer conduit outlet or the spent regeneration gas outlet means. The utilization of one of the cyclone separators in a broad embodiment is shown in FIG. 1. An even more preferred use of a three cyclone separation system is shown in FIG. 2 in which cyclones are connected to the transfer conduit outlet and to the spent regeneration gas outlet.

In a specific illustration of a preferred embodiment of the apparatus of this invention, an essentially cylindrical shaped spent catalyst receiving chamber having a diameter of about 12 feet and a height of about 20 feet is connected to a substantially vertical transfer conduit approximately 50 feet long and having a six foot diameter. At the top of the transfer conduit is an outlet which emptys into a regenerated catalyst receiving chamber which is placed over the conduit and having its walls connected to the upper-outer walls of the spent catalyst receiving chamber. The regenerated catalyst receiving chamber is approximately 60 feet in length having its inside diameter at its lower portion approximately 12 feet in diameter and designed to carry a dense bed in the annular space between the inside walls of the lower portion of the regenerated catalyst receiving chamber and the outer walls of the vertical transfer conduit which runs through the regenerated catalyst receiving chamber. Approximately 20 feet above the lowermost portion of the regenerated catalyst receiving chamber the diameter of that chamber is increased as it becomes swedged out to a diameter of approximately 18 to 20 feet. Such an apparatus is capable of regenerating approximately 1,800,000 pounds per hour of spent catalyst with sufficient regeneration gas passing through the system to maintain roughly a dense bed in the spent catalyst receiving chamber having density of around 10 pounds per cubic foot, a density within the vertical transfer conduit of approximately 2 pounds per cubic foot, and density of the dense bed located in the lower portion of the regenerated catalyst receiving chamber anywhere from 20 to 30 pounds per cubic foot.

Utilizing this type of a design, it is possible to substantially reduce the inventory of catalyst present within the regeneration apparatus while essentially, if not totally, eliminating carbon monoxide emissions to the atmosphere. Other advantages include higher temperature regenerated catalyst which can be passed to a reaction zone and a reduced contact time of the catalyst being regenerated during afterburning at a higher temperature, thereby increasing the life of the catalyst by substantially reducing thermal damage to the catalyst from excessive time periods at high temperatures.

One of the most important advantages in utilizing the apparatus described above is the fact that when afterburning takes place and preferably within the transfer conduit, the density of catalyst in the transfer conduit is much higher than the catalyst densities which would take place in the normal regenerator in the areas in the upper portion of the regenerator near the flue gas cyclones. Specifically, the density within the transfer conduit can vary anywhere from above about 1.5 pounds per cubic foot up to about 8 or more pounds per cubic foot depending upon the regeneration gas flow rate, the physical size of the conduit, and catalyst density. In normal regeneration operations assuming 99% cyclone efficiency, the normal maximum density of the gases within the vicinity of the cyclones are generally about 0.9 pounds per cubic foot of gas. This density is much lower than the density found in the transfer conduit in our apparatus, and inherently will not offer a suitable heat sink for removal of liberated heat of reaction from the afterburning of carbon monoxide in the vicinity of the cyclones when compared to the conditions in which afterburning takes place in the transfer conduit in our apparatus. Specifically, there can be anywhere from about 2 to 10 or more times the density of catalyst in the transfer conduit where afterburning occurs than in normal regeneration zone cyclones. The higher density of catalyst in the transfer conduit substantially eliminated problems occuring from localized high temperature gradients caused by a liberation of heat of reaction from the afterburning reaction since all the catalyst regenerated must pass through the transfer conduit. Typically, and as such has been referred to previously in U.S. Pat. 3,563,911 at column 4 lines 55 through 65 thereof, it is desired that some sort of afterburning take place within the regeneration process of that patent. In that patent, the afterburning which is desired to take place occurs within the upper portion in the dilute phase of the regenerator at a place in the regenerator in which relatively low catalyst densities are present thereby increasing the chances of localized hot spots occurring since there is not a sufficient quantity of catalyst as compared to the transfer conduit in our apparatus to remove heat liberated from the burning of carbon monoxide to carbon dioxide. This in our opinion is one of the primary advantages of our apparatus.

The above specific descriptions have been presented to illustrate preferred embodiments of the apparatus of our invention. We do not intend to unreasonably limit the claims of our apparatus by specific reference to sizes.

We claim as our invention:

1. A catalyst regeneration apparatus for oxidizing coke on a spent catalyst with a fresh regeneration gas and oxidizing carbon monoxide (produced by the oxidation of coke) within said apparatus comprising in combination:
    (a) a regeneration vessel having disposed therein, a spent catalyst receiving chamber, a regenerated catalyst receiving chamber, and a transfer conduit and catalyst-regeneration gas separation means interposed between said spent catalyst and regenerated catalyst receiving chambers;
    (b) said spent catalyst receiving chamber having upper and lower sections, a fresh regeneration gas inlet means connected to said spent catalyst receiving chamber at said lower section to allow passage of fresh regeneration gas into said spent catalyst receiving chamber through said lower portion, a spent catalyst inlet means connected to said spent catalyst receiving chamber to allow passage of spent catalyst into said spent catalyst receiving chamber, said spent catalyst receiving chamber positioned to maintain a dense bed of spent catalyst within the spent catalyst receiving chamber and to allow passage of a mixture of regenerated catalyst and regeneration gas containing carbon monoxide out of said spent catalyst receiving chamber through a catalyst-gas outlet positioned in the upper section of said spent catalyst receiving chamber;
    (c) said vertically disposed transfer conduit being located wholly within a hereinafter described regenerated catalyst receiving chamber, said conduit having a cap closing the top thereof, an upper outlet means in said conduit positioned to discharge laterally within said upper section of said regenerated catalyst receiving chamber, a lower inlet means connected to said spent catalyst receiving chamber to allow passage of said mixture of regenerated catalyst and regeneration gas from said spent catalyst chamber through said conduit, and a means for effecting combustion located between the upper outlet means and the lower inlet means of said conduit;
    (d) said catalyst-regeneration gas separation means adapted to separate said mixture of regenerated catalyst and regeneration gas, having an inlet for receiving said mixture, a regenerated catalyst outlet and a regeneration gas outlet said inlet connected to said upper outlet of said transfer conduit; and
    (e) said regenerated catalyst receiving chamber for maintaining a dense bed of regenerated catalyst being in communication with said separation means outlets and having an upper section and a lower section, a regeneration gas outlet means connected to said regenerated catalyst receiving chamber at its upper section to allow passage of regeneration gas substantially free of regenerated catalyst from said regenerated catalyst receiving chamber, a regenerated catalyst outlet means connected to said regenerated catalyst receiving chamber, the lower section of said regenerated catalyst receiving chamber being separated from the upper portion of said spent catalyst receiving chamber by a wall means whereby to maintain said bed of regenerated catalyst segregated from the dense bed of catalyst in said spent catalyst receiving chamber.

2. The catalyst regeneration system of claim 1 further characterized in that gas separation means are attached to said upper outlet means whereby substantial separation of regeneration and entrained catalyst leaving the transfer conduit is effected.

References Cited

UNITED STATES PATENTS

| | | | |
|---|---|---|---|
| 2,398,496 | 4/1946 | Edmister et al | 23—288 SX |
| 2,337,684 | 12/1943 | Scheineman | 23—288 S |
| 2,373,008 | 4/1945 | Becker | 23—288 SX |
| 2,401,739 | 6/1946 | Johnson | 252—417 |

JAMES H. TAYMAN, JR., Primary Examiner

U.S. Cl. X.R.

23—288 S; 208—159, 164; 252—417, 419